United States Patent
Alnaimi

(10) Patent No.: US 11,612,135 B1
(45) Date of Patent: Mar. 28, 2023

(54) LABORATORY ANIMAL RESTRAINT

(71) Applicant: KING FAISAL UNIVERSITY, Al-Ahsa (SA)

(72) Inventor: Samar Abdullah Shaheen Alnaimi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 17/985,584

(22) Filed: Nov. 11, 2022

(51) Int. Cl.
*A01K 1/00* (2006.01)
*A01K 1/06* (2006.01)

(52) U.S. Cl.
CPC .................... *A01K 1/0613* (2013.01)

(58) Field of Classification Search
CPC .................................................. A01K 1/0613
USPC ............................................ 119/814; 43/134
See application file for complete search history.

(56) References Cited

U.S. PATENT DOCUMENTS

| | | | |
|---|---|---|---|
| 3,237,602 A | 3/1966 | Rens | |
| 3,717,128 A | 2/1973 | Pearman et al. | |
| 4,059,869 A | 11/1977 | Dunstheimer | |
| 4,329,942 A | 5/1982 | King | |
| 5,497,510 A * | 3/1996 | Knowles | A41D 13/087 2/21 |
| 5,669,632 A * | 9/1997 | Johnson | B60R 21/233 280/743.1 |
| 2014/0366812 A1 * | 12/2014 | Leone | A01K 1/0613 29/428 |

FOREIGN PATENT DOCUMENTS

| | | |
|---|---|---|
| CN | 109528344 A | 3/2019 |
| GB | 2343608 B | 5/2003 |
| GB | 2448768 A | 10/2008 |
| TW | M443513 U | 12/2012 |

OTHER PUBLICATIONS

"Walbest Dog Grooming Sling Hammock"; printed on Jan. 10, 2022 from https://www.amazon.com/Walbest-Grooming-Relaxation-Restraint-Trimming/dp/B08YKGDMVG/ref=asc_df_B08YKGDMVG/?tag=hyprod-20&linkCode=df0&hvadid=507628637756&hvpos=&hvnetw=g&hvrand=2804013428265297888&hvpone=&hvptwo=&hvqmt=&hvdev=c&hvdvcmdl=&hvlocint=&hvlocphy=9009346&hvtargid=pla-1297320099088&th=1.

* cited by examiner

*Primary Examiner* — Richard T Price, Jr.
(74) *Attorney, Agent, or Firm* — Nath, Goldberg & Meyer; Richard C. Litman

(57) ABSTRACT

A laboratory animal restraint includes a glove and a claw detachably connected to the glove. The claw includes a first retaining member and a second retaining member. The first retaining member includes a first upper bar, a first lower bar and a plurality of first arcuate ribs connecting and extending between the first upper bar and the first lower bar. Similarly, the second retaining member includes a second upper bar, a second lower bar and a plurality of second arcuate ribs connecting and extending between the second upper bar and the second lower bar. A flexible flap is fixedly secured to the first lower bar and is adapted to be releasably secured to the second lower bar. The first upper bar and the second upper bar are pivotally secured to one another.

6 Claims, 5 Drawing Sheets

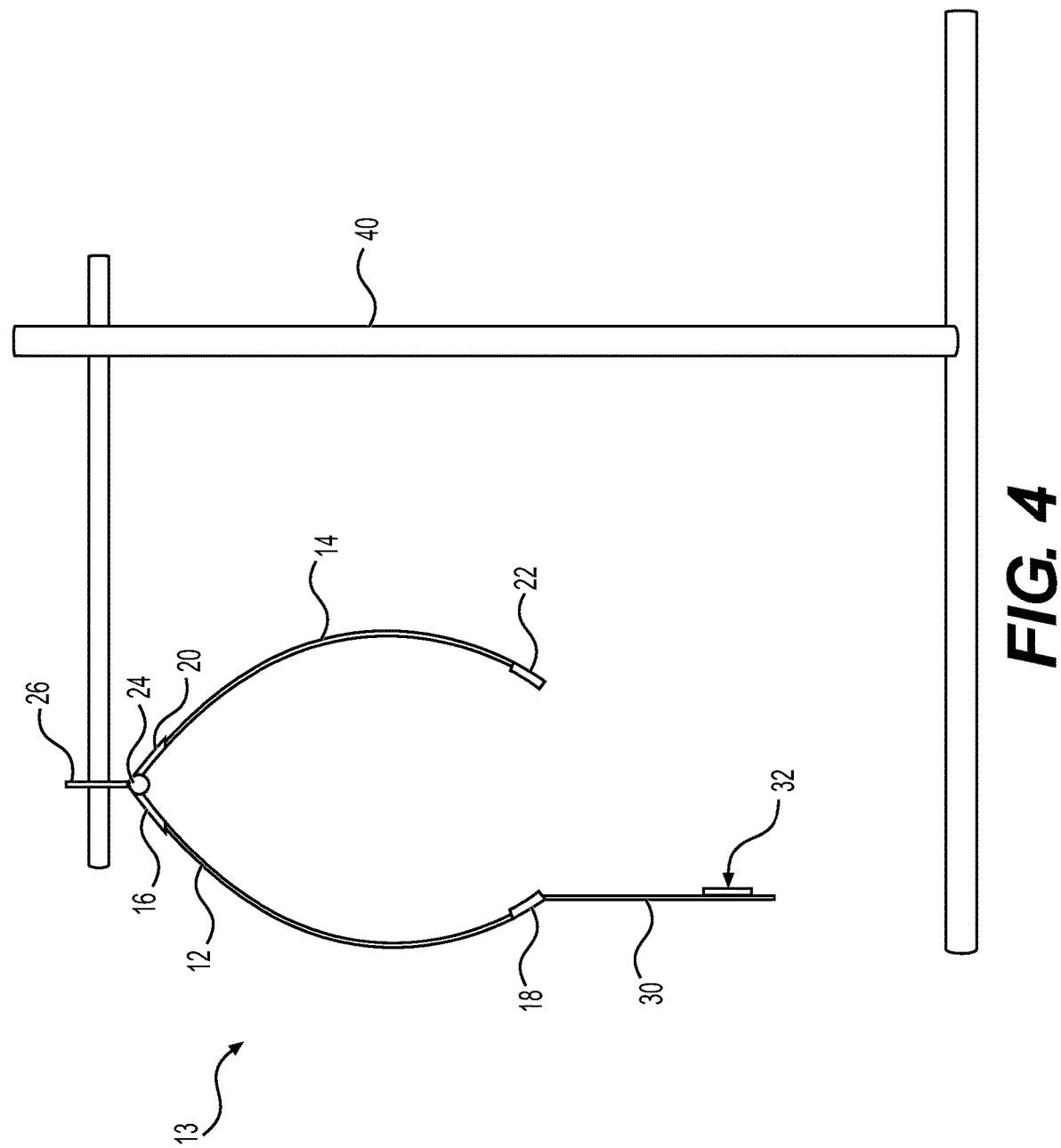

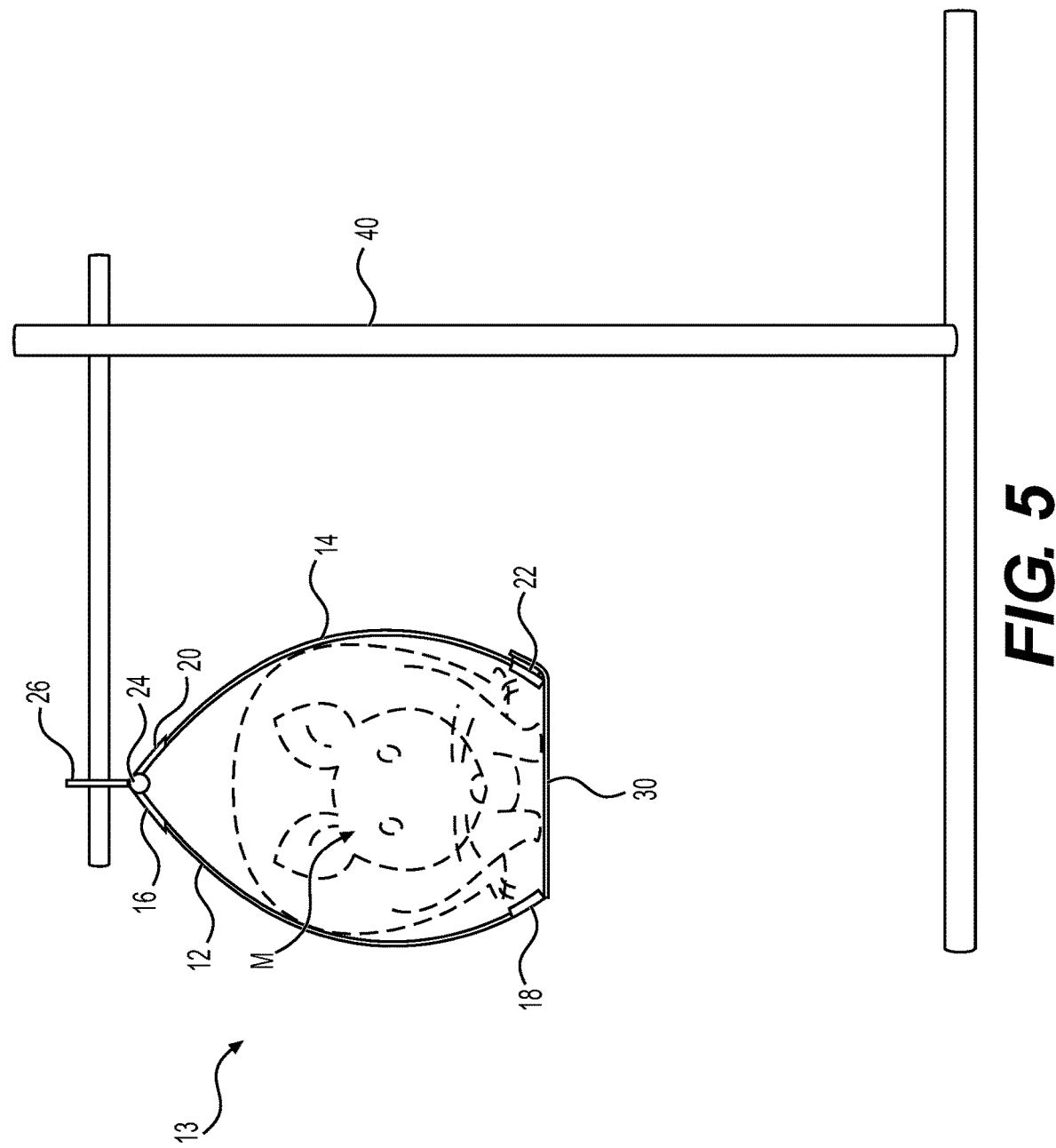

LABORATORY ANIMAL RESTRAINT

BACKGROUND

1. Field

The disclosure of the present patent application relates to the handling of animals, and particularly to a restraint for laboratory animals which provides protection for laboratory personnel and is also safe and comfortable for the animal.

2. Description of the Related Art

In order to perform common procedures on laboratory animals, such as drawing blood and force feeding an animal, a researcher is typically required to hold the animal with one hand while manipulating the syringe, feeding tube, or the like with the other hand. Having only one hand available to hold and manipulate the animal limits control over the animal and often results in bites, scratches, and escapes. A wide variety of cages and cage-like structures have been developed over the years which require the researcher to first move the animal from its usual pen or cage into the specialized cage for the procedure. However, during this transfer, the researcher remains vulnerable to injury and escape of the animal. Additionally, such specialized structures for holding the animal completely still are typically very constrictive. As such, animals are resistant to entering the structure and, when in the structure, fight to escape. Thus, a laboratory animal restraint solving the aforementioned problems is desired.

SUMMARY

The laboratory animal restraint is a restraining holder for laboratory animals which provides protection for laboratory personnel and is also safe and comfortable for the animal. The laboratory animal restraint includes a glove and a claw detachably connected the glove. The claw includes a first retaining member and a second retaining member. The first retaining member includes a first upper bar, a first lower bar and a plurality of first arcuate ribs connecting and extending between the first upper bar and the first lower bar. Similarly, the second retaining member includes a second upper bar, a second lower bar and a plurality of second arcuate ribs connecting and extending between the second upper bar and the second lower bar. A flexible flap is fixedly secured to the first lower bar and is adapted to be releasably secured to the second lower bar. The flexible flap is releasably secured to the second lower bar using any suitable type of releasable attachment, such as, for example, an adhesive strip, hook-and-loop fasteners, snaps or the like. The first upper bar and the second upper bar are pivotally secured to one another, and the plurality of first arcuate ribs and the plurality of second arcuate ribs each curve outwardly to define an interior region adapted for receiving the animal.

A mounting tab may be secured to the first and second retaining members. The mounting tab has an opening formed therethrough adapted for receiving a portion of an external stand, such that laboratory animal restraint can be hung from, or otherwise releasably mounted to, an external stand.

In use, a laboratory technician or the like can insert one hand in the glove and pivot the first retaining member and the second retaining member apart from one another. Initially, the flexible flap can be unattached from the second lower bar, thus creating an open interior space for picking up and receiving the animal. The first retaining member and the second retaining member are placed around the animal and gently closed around the animal, in a manner similar to a mechanical claw. The flexible flap is then attached to the second lower bar, providing a comfortable lower support or floor for the animal to rest on while positioned between the first and second retaining member. The claw can then be detached from the glove and hung from the external support by the mounting tab. The laboratory technician or the like can then perform tests on the animal, treat the animal, feed the animal, etc. using both hands while the animal is comfortably restrained.

These and other features of the present invention will become readily apparent upon further review of the following specification.

BRIEF DESCRIPTION OF THE DRAWINGS

FIG. 4 is a side view of the laboratory animal restraint hung from the external stand.

FIG. 5 is a side view of the laboratory animal restraint hung from the external stand and restraining a laboratory animal.

Similar reference characters denote corresponding features consistently throughout the attached drawings.

DETAILED DESCRIPTION OF THE PREFERRED EMBODIMENTS

Figure 1:
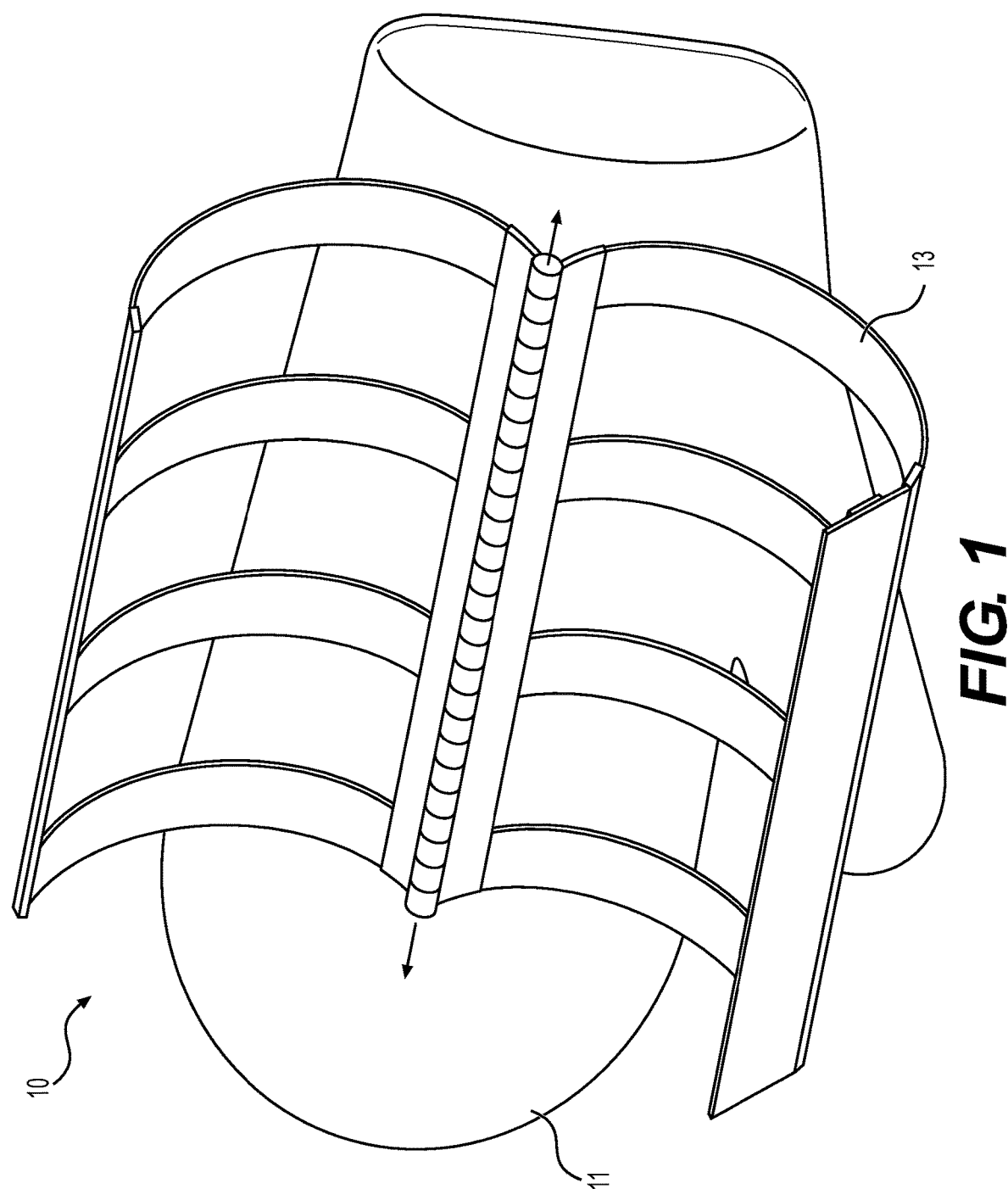
FIG. 1 is a perspective view of a laboratory animal restraint.
Figure 2:
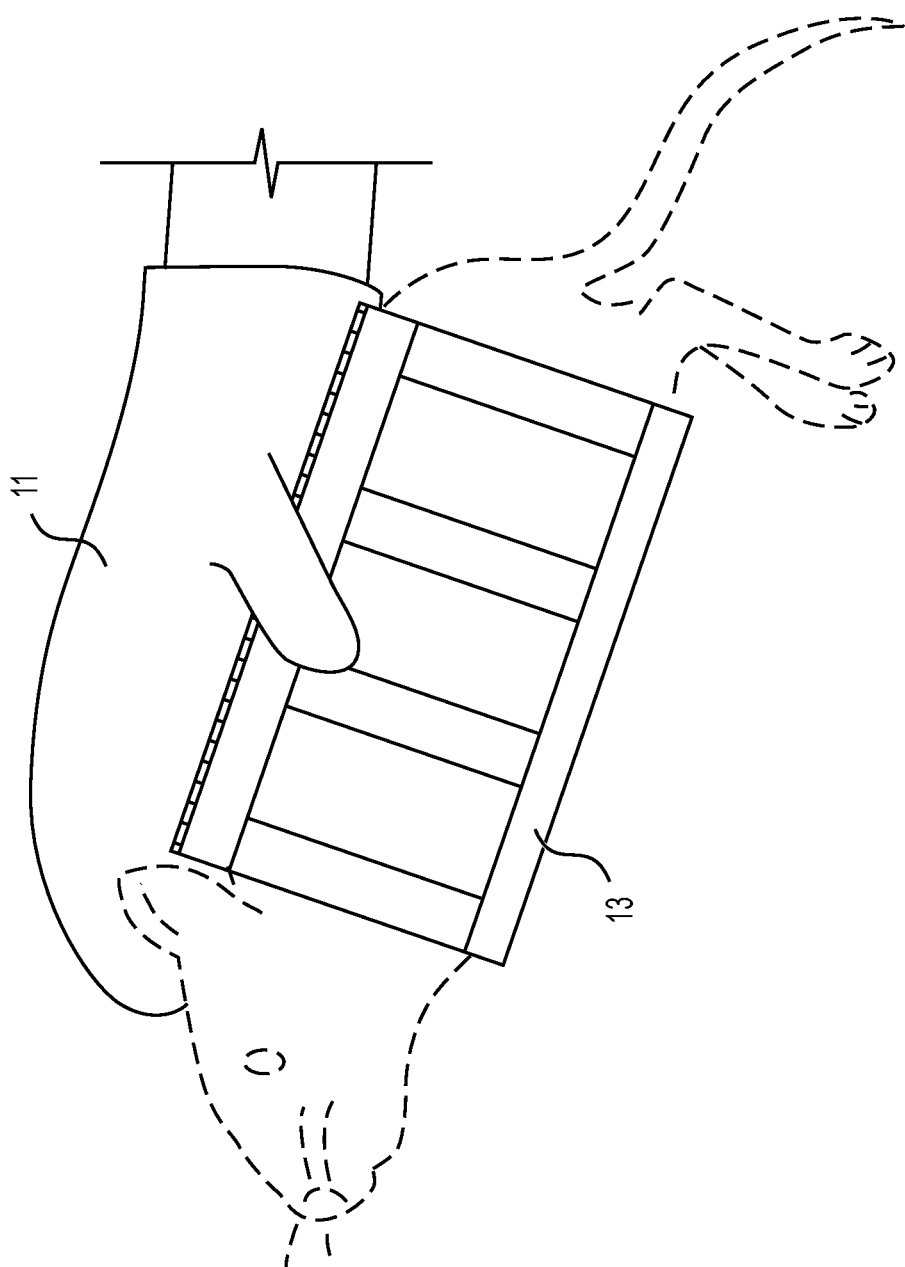
FIG. 2 is an environmental front view of the laboratory animal restraint in use for capturing an animal.

A laboratory animal restraint 10 is a restraining holder for laboratory animals which provides protection for laboratory personnel and is safe and comfortable for the animal. As shown in FIGS. 1 and 2, the laboratory animal restraint 10 includes a glove 11 and a claw 13 detachably connected to the glove 11. The claw 13 includes a first retaining member 12 and a second retaining member 14. The first retaining member 12 includes a first upper bar 16, a first lower bar 18 and a plurality of first arcuate ribs 34 connecting and extending between the first upper bar 16 and the first lower bar 18. Similarly, the second retaining member 14 includes a second upper bar 20, a second lower bar 22 and a plurality of second arcuate ribs 36 connecting and extending between the second upper bar 20 and the second lower bar 22. The claw 13 may be detachably connected to the glove 11 with any suitable fastening means, e.g., hook-and-loop fasteners. It should be understood that the overall configuration of each of the first and second retaining members 12, 14 is shown for exemplary purposes only, and that each of the first and second retaining members 12, 14 may be sized and shaped to include a number of ribs 34, 36 which are dependent upon the particular type of animal being restrained. As shown, the ribs 34, 36 are spaced apart, providing open spaces, similar to a cage, thus allowing the animal to be restrained but without being fully confined.

A flexible flap 30 is fixedly secured to the first lower bar 18 and is adapted to be releasably secured to the second lower bar 22. The flexible flap 30 is releasably secured to the second lower bar 22 using any suitable type of releasable attachment, such as, for example, an adhesive strip, hook-and-loop fasteners, snaps or the like. In the non-limiting example of FIG. 4, an adhesive strip 32 is applied to flexible flap 30 for releasably securing free end 33 to the second lower bar 22. In this non-limiting example, adhesive strip 32 may be covered by a release strip, for example, when flexible flap 30 is not attached to the second lower bar 22. It should be understood that the flexible flap 30 may be made of any suitable type of material, such as, for example, cloth, canvas or the like.

Figure 3:
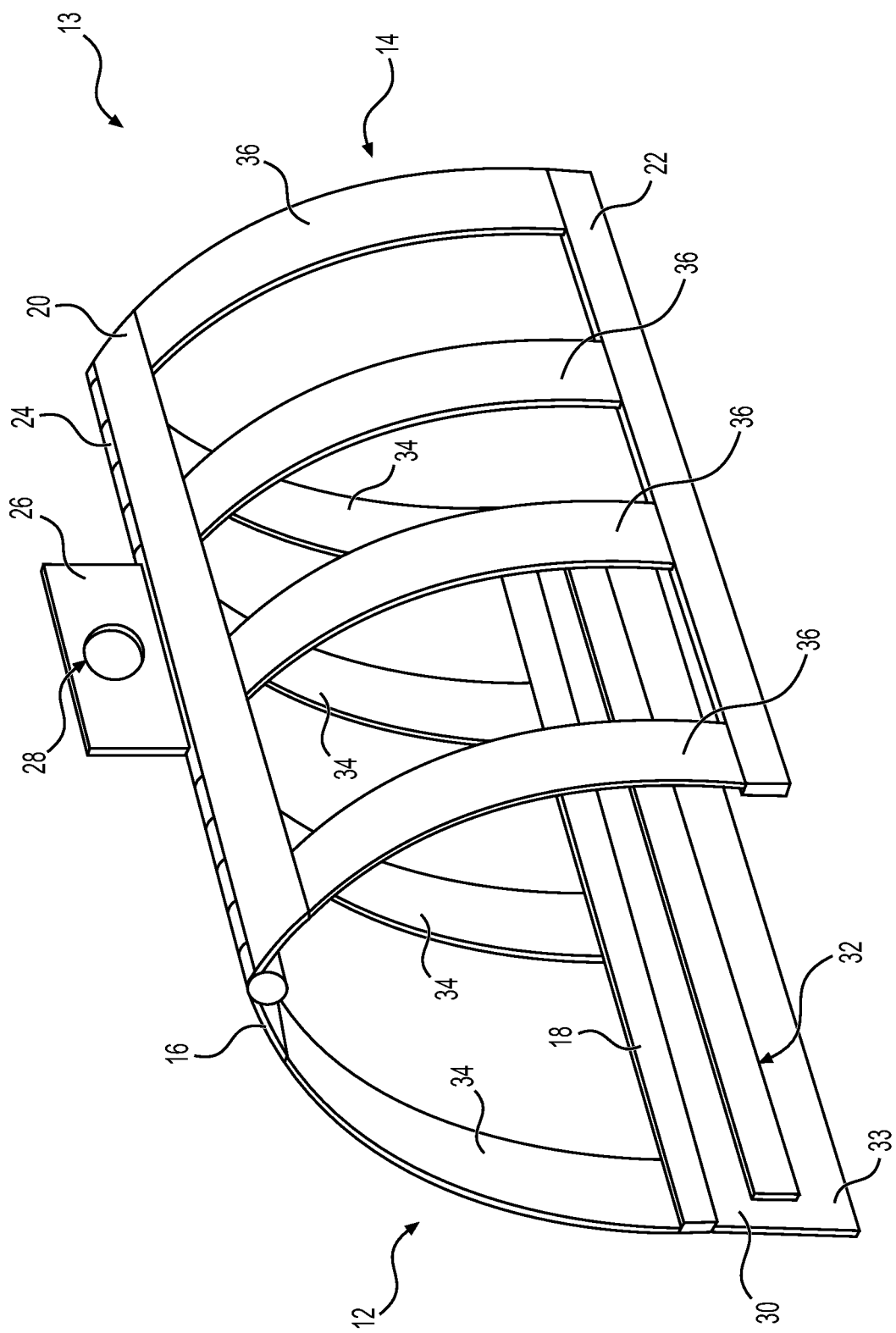
FIG. 3 is a perspective view of the claw of the laboratory animal restraint.

Additionally, as shown in FIG. 3, the first upper bar 16 and the second upper bar 20 are pivotally secured to one another by a hinge 24 or the like. It should be understood that the hinge 24 is shown in FIG. 3 for exemplary purposes only, and that any suitable type of pivotal attachment may be used. In an embodiment, a detachable fastener 25, e.g., hook-and-loop fastener, may be provided over the hinge 24 and/or on the arcuate ribs 34, 36 to facilitate detachable fastening of the claw 13 to the glove 11. Further, as shown, the plurality of first arcuate ribs 34 and the plurality of second arcuate ribs 36 each curve outwardly to define an interior region adapted for receiving the animal.

Additionally, a foldable mounting tab 26 may be secured to the first and second retaining members 16, 20, respectively. The mounting tab 26 has an opening 28 formed therethrough adapted for receiving a portion of an external stand 40, such that laboratory animal restraint 10 can be hung from, or otherwise releasably mounted to, the external stand 40. It should be understood that the external stand 40 is shown in FIGS. 4 and 5 for exemplary purposes only. Further, it should be understood that the overall configuration of mounting tab 26 may be varied dependent upon the particular type of external stand or other support being used.

In use, a laboratory technician or the like can, after wearing the glove 11, pivot the first retaining member 12 and the second retaining member 14 apart from one another, with the flexible flap 30 detached from the second lower bar 22, thus creating an open interior space for picking up and receiving the animal. The first retaining member 12 and the second retaining member 14 are then placed around the animal and gently closed around the animal, in a manner similar to a mechanical claw, as shown in FIG. 2. The flexible flap 30 is then attached to the second lower bar 22, providing a comfortable lower support or floor for the animal to rest on while positioned between the first and second retaining member 12, 14, respectively. As shown in FIG. 5, the laboratory animal restraint 10 can then be hung from the external support 40 by the mounting tab 26, and the laboratory technician or the like can perform tests on the animal, treat the animal, feed the animal, etc. using both hands while the animal is comfortably restrained. It should be understood that the mouse M is shown in FIG. 5 for exemplary and illustrative purposes only, and that the laboratory animal restraint 10 may be used for restraining any suitable type of laboratory animal.

It is to be understood that the laboratory animal restraint is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A laboratory animal restraint, comprising:
a glove; and
a claw detachably connected to the glove, the claw including
  a first retaining member comprising a first upper bar, a first lower bar and a plurality of first arcuate ribs connecting and extending between the first upper bar and the first lower bar,
  a second retaining member comprising a second upper bar, a second lower bar and a plurality of second arcuate ribs connecting and extending between the second upper bar and the second lower bar, and
  a flexible flap fixedly secured to the first lower bar and adapted to be releasably secured to the second lower bar,
wherein the first upper bar and the second upper bar are pivotally secured to one another, and
wherein the plurality of first arcuate ribs and the plurality of second arcuate ribs each curve outwardly to define an interior region adapted for receiving an animal.

2. The laboratory animal restraint as recited in claim 1, further comprising a mounting tab secured to the first and second retaining members, the mounting tab having an opening formed therethrough, whereby the mounting tab is adapted for hanging the laboratory animal restraint from an external stand.

3. The laboratory animal restraint as recited in claim 1, wherein the mounting tab is foldable.

4. A laboratory animal restraint, comprising:
a claw including
  a first retaining member comprising a first upper bar, a first lower bar and a plurality of first arcuate ribs connecting and extending between the first upper bar and the first lower bar,
  a second retaining member comprising a second upper bar, a second lower bar and a plurality of second arcuate ribs connecting and extending between the second upper bar and the second lower bar, wherein the first upper bar and the second upper bar are pivotally secured to one another, and wherein the plurality of first arcuate ribs and the plurality of second arcuate ribs each curve outwardly to define an interior region adapted for receiving an animal,
  a flexible flap fixedly secured to the first lower bar and adapted to be releasably secured to the second lower bar; and
a mounting tab secured to the first and second retaining members, the mounting tab having an opening formed therethrough.

5. The laboratory animal restraint as recited in claim 4, further comprising:
a stand, wherein the mounting tab is adapted for hanging from the stand.

6. The laboratory animal restraint as recited in claim 4, further comprising a glove detachably connected to the claw.

* * * * *